(12) United States Patent
Hanlon et al.

(10) Patent No.: US 7,093,424 B2
(45) Date of Patent: Aug. 22, 2006

(54) THRUST REVERSER SYSTEM ELECTRO-MECHANICAL BRAKE MANUAL RELEASE MECHANISM

(75) Inventors: Casey Hanlon, Queen Creek, AZ (US); Donald J. Christensen, Phoenix, AZ (US); Kevin K. Chakkera, Chandler, AZ (US)

(73) Assignee: Honeywell International, Inc., Morristown, NJ (US)

( * ) Notice: Subject to any disclaimer, the term of this patent is extended or adjusted under 35 U.S.C. 154(b) by 108 days.

(21) Appl. No.: 10/925,700

(22) Filed: Aug. 24, 2004

(65) Prior Publication Data

US 2006/0042229 A1    Mar. 2, 2006

(51) Int. Cl.
*F02K 1/70* (2006.01)
*F02K 1/76* (2006.01)

(52) U.S. Cl. ............. 60/226.2; 244/110 B; 239/265.23

(58) Field of Classification Search ............... 60/226.2, 60/230; 244/110 B; 239/265.23, 265.25, 239/265.27, 265.29, 265.31
See application file for complete search history.

(56) References Cited

U.S. PATENT DOCUMENTS

| | | | |
|---|---|---|---|
| 2,512,565 A * | 6/1950 | Hallander .................. 188/171 |
| 3,127,969 A | 4/1964 | Hansen |
| 4,476,965 A | 10/1984 | Brown, Jr. et al. |
| 4,909,359 A | 3/1990 | Fujinami et al. |
| 5,186,287 A * | 2/1993 | Lindner et al. ............. 188/171 |
| 5,280,704 A | 1/1994 | Anderson et al. |
| 5,620,065 A | 4/1997 | Baker et al. |
| 5,685,398 A | 11/1997 | Marshall et al. |
| 5,806,646 A | 9/1998 | Grosspietsch et al. |
| 5,953,904 A | 9/1999 | Mountney |
| 6,125,975 A | 10/2000 | Seeto et al. |
| 6,487,846 B1 * | 12/2002 | Chakkera et al. .......... 60/226.2 |
| 6,666,307 B1 | 12/2003 | Christensen |
| 6,786,039 B1 * | 9/2004 | Chakkera et al. .......... 60/226.2 |
| 6,786,315 B1 * | 9/2004 | Christensen ............... 192/48.7 |
| 2005/0001095 A1 * | 1/2005 | Christensen ............ 244/110 B |

* cited by examiner

*Primary Examiner*—Ted Kim
(74) *Attorney, Agent, or Firm*—Ingrassia Fisher & Lorenz (57) ABSTRACT

A manual release mechanism for a thrust reverser actuation system electromechanical brake includes a first release plate, a second release plate, at least two balls, and a handle. The first and second release plates each have grooves formed therein that have a cam surface located at a predetermined angle. The release plates face one another such that the grooves in each plate are substantially aligned, and the balls are each positioned in the aligned grooves. The first release plate is configured to rotate, and the second release plate is configured to translate. The handle is coupled to the first release plate to allow manual rotation thereof. In response to rotation of the first release plate, the second release plate will translate and disengage the electromechanical brake.

23 Claims, 7 Drawing Sheets

THRUST REVERSER SYSTEM ELECTRO-MECHANICAL BRAKE MANUAL RELEASE MECHANISM

TECHNICAL FIELD

The present invention relates to aircraft engine thrust reverser actuation systems and, more particularly, to a manual release mechanism for a thrust reverser actuation system electromechanical brake.

BACKGROUND

When a jet-powered aircraft lands, the landing gear brakes and aerodynamic drag (e.g., flaps, spoilers, etc.) of the aircraft may not, in certain situations, be sufficient to slow the aircraft down in the required amount of runway distance. Thus, jet engines on most aircraft include thrust reversers to enhance the braking of the aircraft. When deployed, a thrust reverser redirects the rearward thrust of the jet engine to a generally or partially forward direction to decelerate the aircraft. Because at least some of the jet thrust is directed forward, the jet thrust also slows down the aircraft upon landing.

Various thrust reverser designs are commonly known, and the particular design utilized depends, at least in part, on the engine manufacturer, the engine configuration, and the propulsion technology being used. Thrust reverser designs used most prominently with jet engines fall into three general categories: (1) cascade-type thrust reversers; (2) target-type thrust reversers; and (3) pivot door thrust reversers. Each of these designs employs a different type of moveable thrust reverser component to change the direction of the jet thrust.

Cascade-type thrust reversers are normally used on high-bypass ratio jet engines. This type of thrust reverser is located on the circumference of the engine's midsection and, when deployed, exposes and redirects air flow through a plurality of cascade vanes. The moveable thrust reverser components in the cascade design includes several translating sleeves or cowls ("transcowls") that are deployed to expose the cascade vanes.

Target-type reversers, also referred to as clamshell reversers, are typically used with low-bypass ratio jet engines. Target-type thrust reversers use two doors as the moveable thrust reverser components to block the entire jet thrust coming from the rear of the engine. These doors are mounted on the aft portion of the engine and may form the rear part of the engine nacelle.

Pivot door thrust reversers may utilize four doors on the engine nacelle as the moveable thrust reverser components. In the deployed position, these doors extend outwardly from the nacelle to redirect the jet thrust.

The moveable thrust reverser components in each of the above-described designs are moved between the stowed and deployed positions by actuators. Power to drive the actuators may come from a dual output power drive unit (PDU), which may be electrically, hydraulically, or pneumatically operated, depending on the system design. A drive train that includes one or more drive mechanisms, such as flexible rotating shafts, may interconnect the actuators and the PDU to transmit the PDU's drive force to the moveable thrust reverser components.

The primary use of thrust reversers is, as noted above, to enhance the braking of the aircraft, thereby shortening the stopping distance during landing. Hence, thrust reversers are usually deployed during the landing process to slow the aircraft. Thereafter, when the thrust reversers are no longer needed, they are returned to their original, or stowed, position. Once in the stowed position, one or more locks are engaged to prevent unintended movement of the thrust reversers and/or actuators that move the thrust reversers.

Although the number of locks may vary, many thrust reverser systems include primary, secondary, and tertiary locks. Depending on thrust reverser system configuration, one or more primary locks may be coupled to one or more of the actuators, one or more secondary locks (or "brakes") may be coupled to the PDU, and one or more tertiary locks may be coupled to one or more of the thrust reversers. Typically, the primary, secondary, and tertiary locks are electromechanical type of locks that are configured as "energized-to-unlock" and "de-energized-to-lock" devices. Thus, if no power is supplied to a lock, it will move to its locked position.

Thrust reverser actuation systems, such as the exemplary systems described above, are generally safe, reliable, and robustly designed. Nonetheless, thrust reverser systems may be subject to maintenance and repair processes. During such processes, power to the locks may not be available, thereby locking the actuators, PDU, and/or thrust reversers against movement. However, in some instances, it may be desired to move, for example, the PDU as part of a repair or maintenance process.

Hence, there is a need for a manual release mechanism for a thrust reverser actuation system electromechanical brake that will allow the brake to be disengaged, if desired, so that the PDU or other thrust reverser components can be moved. The present invention addresses at least this need.

BRIEF SUMMARY

The present invention provides a manual release mechanism for a thrust reverser actuation system electromechanical brake. In one embodiment, and by way of example only, a system for moving an aircraft thrust reverser includes a power drive unit, a thrust reverser actuator assembly, an electromechanical brake, and a manual brake release mechanism. The power drive unit is operable to rotate and thereby supply a rotational drive force. The thrust reverser actuator assembly is coupled to receive the rotational drive force and is operable, in response thereto, to selectively move the thrust reverser between a stowed position and a deployed position. The electromechanical brake is coupled to the power drive unit, is configured to receive a brake release command, and is operable, in response thereto, to selectively move between an engage and a disengage position, to thereby prevent and allow, respectively, rotation of the power drive unit. The manual brake release mechanism is disposed proximate the electromechanical brake and is configured to selectively move the electromechanical brake between the engage and disengage position. The manual brake release mechanism includes a first release plate and a second release plate. The first release plate is configured to selectively rotate in either a first or a second rotational direction in response to an input force. The second release plate is coupled to the first release plate and is configured to move in either a first or a second translational direction in response to the first release plate rotating in the first or second rotational direction, respectively, to thereby selectively engage or disengage the electromechanical brake, respectively, and thereby move the electromechanical brake to the disengage or engage position, respectively.

In another exemplary embodiment, a thrust reverser system electromagnetic brake assembly includes a housing, a rotor plate, an armature, one or more springs, an armature coil, and a manual brake release mechanism. The rotor plate is rotationally mounted within the housing. The armature is mounted against rotation within the housing and disposed proximate the rotor plate. The armature is configured to move between an engage position, in which the armature engages the rotor plate to prevent rotation thereof, and a disengage position, in which the armature does not engage the rotor plate to allow rotation thereof. The one or more springs are disposed within the housing and are configured to supply a bias force that biases the armature toward the engaged position. The armature coil is disposed within the housing and is configured to be selectively energized, to thereby generate a magnetic force that moves the armature to the disengaged position. The manual brake release mechanism is disposed proximate the electromechanical brake and is configured to selectively move the armature between the engage and disengage position. The manual brake release mechanism includes a first release plate and a second release plate. The first release plate is configured to selectively rotate in either a first or a second rotational direction in response to an input force. The second release plate is coupled to the first release plate and is configured to move in either a first or a second translational direction in response to the first release plate rotating in the first or second rotational direction, respectively, to thereby engage or disengage the armature, respectively, and thereby move the armature to the disengage or engage position, respectively.

In yet another exemplary embodiment, a thrust reverser system manual brake release mechanism includes a first release plate, a second release plate, at least two balls, a handle, an alignment mechanism, and a spring. The first release plate includes an exterior side and an interior side. At least two grooves are formed in the first release plate interior side, and each has a cam surface located at a predetermined angle. The second release plate includes an exterior side and an interior side, and the second release plate interior side is positioned opposed to the first release plate interior side. At least two grooves are formed in the second release plate interior side and are substantially aligned with at least two of the grooves in the first release plate. The grooves in the second release plate each have a cam surface located at a predetermined angle. The balls are each positioned in the aligned grooves. The handle is coupled to, and extends from, the first release plate to allow manual rotation thereof. The alignment mechanism extends at least partially through the first and second release plates, and a plurality of slots is formed on the manual brake alignment mechanism. The spring has a first end and a second end. The spring first end is coupled to the handle, and the spring second end is disposed within one of the manual brake alignment mechanism slots.

Other independent features and advantages of the preferred thrust reverser system, brake, and manual release mechanisms, will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it is to be appreciated that the described embodiment is not limited to use in conjunction with a specific thrust reverser system design. Thus, although the description is explicitly directed toward an embodiment that is implemented in a cascade-type thrust reverser system, in which transcowls are used as the moveable thrust reverser component, it should be appreciated that it can be implemented in other thrust reverser actuation system designs, including those described above and those known now or hereafter in the art.

Figure 1:
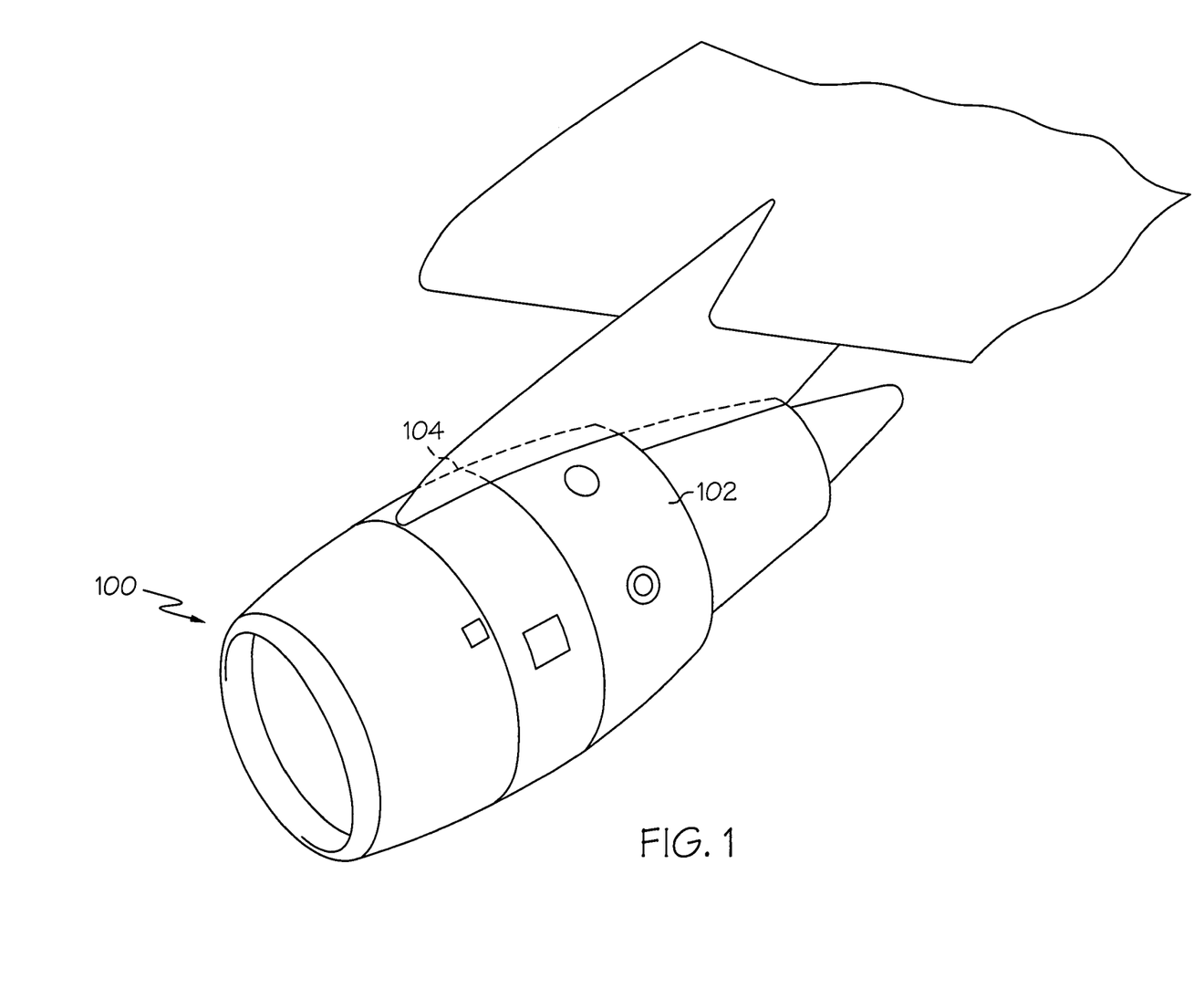
FIG. 1 is a perspective view of portions of an aircraft jet engine fan case.

Turning now to the description, and with reference first to FIG. 1, a perspective view of portions of an aircraft jet engine fan case 100 that incorporates a cascade-type thrust reverser is depicted. The engine fan case 100 includes a pair of semi-circular transcowls 102 and 104 that are positioned circumferentially on the outside of the fan case 100. The transcowls 102 and 104 cover a plurality of non-illustrated cascade vanes. A mechanical link 202 (see FIG. 2), such as a pin or latch, may couple the transcowls 102 and 104 together to maintain the transcowls 102 and 104 in correct alignment on non-illustrated guides on which the transcowls 102 and 104 translate. When the thrust reversers are commanded to deploy, the transcowls 102 and 104 are translated aft. This, among other things, exposes the cascade vanes, and causes at least a portion of the air flowing through the engine fan case 100 to be redirected, at least partially, in a forward direction. This re-direction of air flow in a forward direction creates a reverse thrust, and thus works to slow the airplane.

Figure 2:
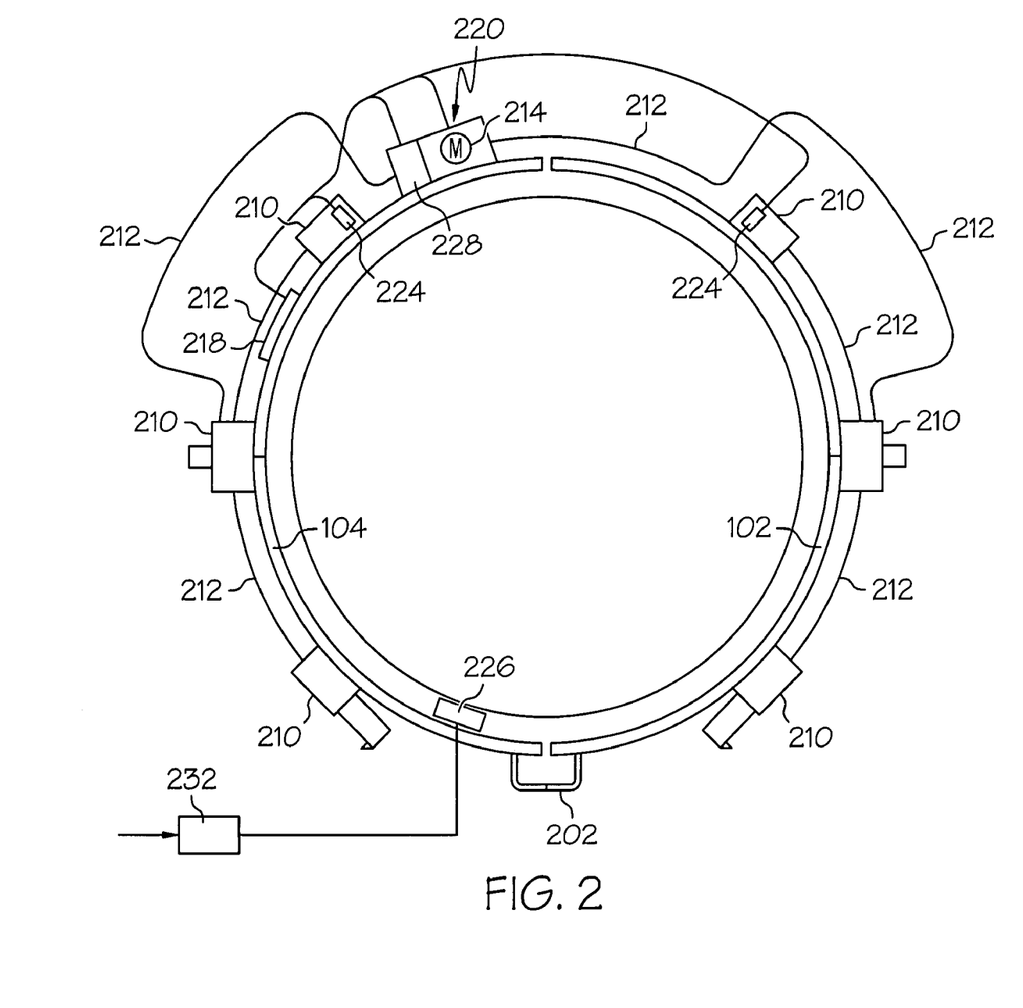
FIG. 2 is a simplified end view of a thrust reverser actuation system according to an exemplary embodiment of the present invention.

The transcowls 102 and 104 are moved between the deploy and stow positions via a thrust reverser control system. An exemplary embodiment of a thrust reverser control system 200 is depicted in FIG. 2, and includes a plurality of actuators 210, which are individually coupled to the transcowls 102 and 104 (not shown in FIG. 3). In the depicted embodiment, half of the actuators 210 are coupled to one of the transcowls 102, and the other half are coupled to another transcowl 104. It is noted that the actuators 210 may be any one of numerous actuator designs presently known in the art or hereafter designed. However, in this embodiment the actuators 210 are ballscrew actuators. It is additionally noted that the number and arrangement of actuators 210 is not limited to what is depicted in FIG. 2, but could include other numbers of actuators 210 as well. The number and arrangement of actuators 210 is selected to meet the specific design requirements of the system.

The actuators 210 are interconnected via a plurality of drive mechanisms 212, each of which, in the particular depicted embodiment, is a flexible shaft. Using flexible shafts 212 in this configuration ensures that the actuators 210 and the transcowls 102 and 104, when unlocked, move in a substantially synchronized manner. For example, when one transcowl 102 is moved, the other transcowl 104 is moved a like distance at substantially the same time. Other synchronization mechanisms that may be used include electrical synchronization or open loop synchronization, or any other mechanism or design that transfers power between the actuators 210.

A power drive unit (PDU) 220 is coupled to the actuators 210 via one or more of the flexible shafts 212. In the depicted embodiment, the PDU 220 includes a motor 214 that is coupled to two of the flexible shafts 212. The motor 214 may be any one of numerous types of motors such as, for example, an electric (including any one of the various DC or AC motor designs known in the art), a hydraulic, or a pneumatic motor. In the depicted arrangement, the rotation of the PDU 220 results in the synchronous operation of the actuators 210, via the flexible shafts 212, thereby causing the transcowls 102 and 104 to move at substantially the same rate.

A control circuit 218 controls the PDU 220, and receives various signals from one or more positions sensors. The control circuit 218 receives commands from an engine control system 222 such as, for example, a FADEC (full authority digital engine control) system, and provides appropriate activation signals to the PDU 220 in response to the received commands. In turn, the PDU 220 supplies a drive force to the actuators 210 via the flexible shafts 212. As a result, the actuators 210 cause the transcowls 102 and 104 to translate between the stowed and deployed positions.

The thrust reverser control system 200 additionally includes a plurality of locks that together function to prevent unintended movement of the transcowls 102 and 104 from the stowed position. In the depicted embodiment, the thrust reverser control system 200 includes two primary locks 224, a tertiary lock 226, and a PDU lock 228 (or "brake"). The primary locks 224 are each mounted on one of the actuators 210 and are configured to selectively prevent movement of one of the actuators 210, and thereby prevent transcowl movement. The tertiary lock 226 is mounted on the engine nacelle (not illustrated) and is configured to selectively engage a portion of one of the transcowls 104 directly. Because the transcowls 102, 104 are coupled via the mechanical link 202, the tertiary lock 226 prevents movement of both transcowls 102, 104. The PDU brake 228 is configured to selectively prevent or allow rotation of the PDU 220, and thereby prevent transcowl movement. In the depicted embodiment, the primary lock 224 and PDU brake 228 are each controlled via the control circuit 218, and the tertiary lock 226 is controlled via a separate tertiary lock control unit 232.

It will be appreciated that the number of locks 224, 226, 228 depicted and described herein is merely exemplary of one particular embodiment, and that other numbers of locks could be used to meet specific design requirements. It will additionally be appreciated that each of the locks 224, 226, 228 is configured to default to a normally locked position by, for example, a biasing spring. Thus, when not commanded to move to the unlocked position, each lock 224, 226, 228 will be in, or move to, the locked position. The specific configuration of the primary 224 and tertiary 226 locks is not necessary to understand or enable the present invention, and will therefore not be provided. However, with reference now to FIGS. 3–8, a detailed description of the PDU brake 228 will be provided.

Figure 3:
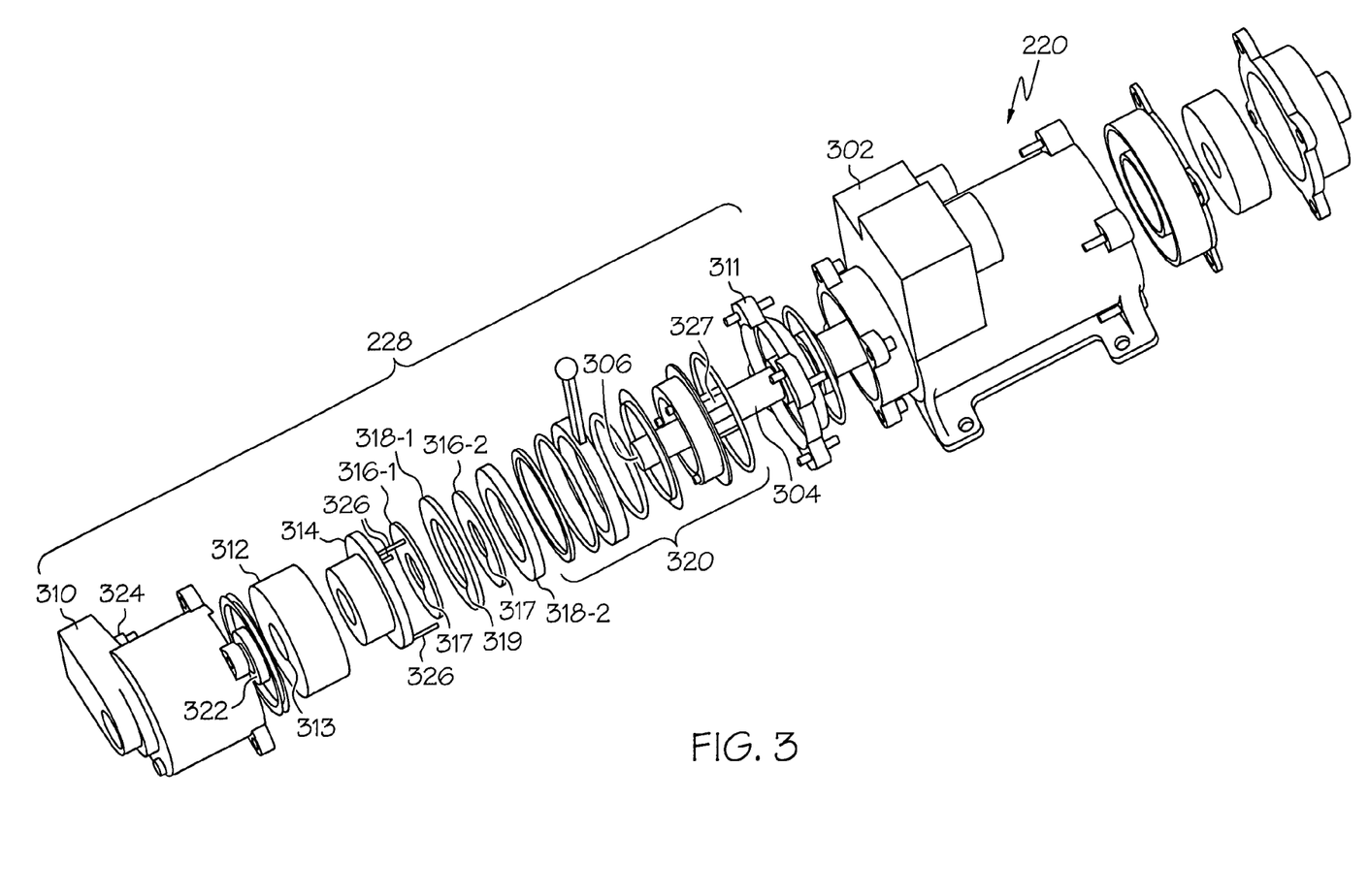
FIG. 3 is an exploded perspective view of an exemplary power drive unit and electromechanical brake that may be used in the system of FIG. 2.

Turning first to FIG. 3, a perspective view of the PDU 220 in its assembled state, together with an exploded view of the PDU brake 228, is shown. The motor 214 (not visible in FIG. 3) is mounted within a motor housing 302, and includes a rotationally mounted output shaft 304 that has a first end 306 and a second end 308 (not visible in FIG. 3). The first 306 and second 308 ends of the output shaft 304 are each adapted to couple to a flexible shaft 212 via, for example, non-illustrated internal splines that are configured to mate with like configured splines on the end sections of the flexible shafts 212. As is clearly shown in FIG. 3, a portion of the output shaft 304 between the motor housing 302 and the output shaft first end 306 extends through the PDU brake 228, which will now be described in more detail.

The PDU brake 228 is an electromechanical brake assembly and includes an armature coil 312, an armature 314, a plurality of rotor plates 316 (e.g., a first 316-1 and a second 316-2 rotor plate), a plurality of stator plates 318 (e.g., a first 318-1 and a second 318-2 stator plate), and a manual brake release mechanism 320, all disposed within a brake housing 310. The brake housing 310 includes a cover plate 311 that encloses the PDU brake components with the brake housing 310, and couples the brake housing 310 to the motor housing 302. The output shaft 304, as alluded to above, extends through the brake housing 310, and in the depicted embodiment is rotationally mounted therein via a seal 322. As FIG. 3 also shows, an electrical input plug 324 is mounted on the brake housing 310. This electrical input plug 324 is configured to receive a brake release command signal, and is electrically coupled to the armature coil 312.

The armature coil 312 is fixedly mounted within the brake housing 310 and, as was just noted, is electrically coupled to the electrical input plug 324. The armature coil 312 includes a central opening 313, through which the output shaft 304 passes. The armature coil 312 is either energized or de-energized, depending on whether the brake release command signal is supplied to the electrical input plug 324. In particular, when the brake release command signal is supplied to the electrical input plug 324, the armature coil is energized. As is generally known, when the armature coil 312 is energized, it generates a magnetic force. This magnetic force acts on the armature 314, which causes the armature 314 to move.

The armature 314 is mounted against rotation within the brake housing 310, but is free to translate axially therein. The armature 314, similar to the armature coil 312, includes a central opening 315 through which the output shaft 304 passes. As is shown more clearly in FIGS. 4 and 5, the armature 314 is partially surrounded by, and is movable within, the armature coil 312. With continued reference to FIG. 4, a plurality of brake springs 402, which are disposed between the armature coil 312 and armature 314 when fully assembled, are configured to supply a bias force to the armature 314 that biases the armature 314 away from the armature coil 312, and into an engage position. As will be discussed further below, the magnetic force that is generated when the armature coil 312 is energized overcomes the bias force supplied by the brake springs 402, and causes the armature 314 to move toward the armature coil 312, and into a disengage position. As FIGS. 3–5 also show, a plurality of engagement pins 326, each having an engagement end 333, are coupled to, and extend from, the armature 314. The purpose of the engagement pins 326 will be discussed in more detail further below.

The rotor plates 316 are mounted on the output shaft 304 and thus rotate when the motor 214 rotates the output shaft 304. In the depicted embodiment, the rotor plates 316 each include a central opening 317 through which the output shaft 304 passes. However, unlike the central opening in the other PDU brake components, the central openings 317 in the rotor plates 316 are splined, and engage an equivalently configured spline connection 327 mounted on the output shaft 304. The configuration of this engagement between the output shaft 304 and the rotor plates 316 allows the rotor plates 316 to translate slightly on the output shaft 304. The reason for this will become apparent when the operation of the PDU brake 228 is discussed in more detail further below.

Figure 4:
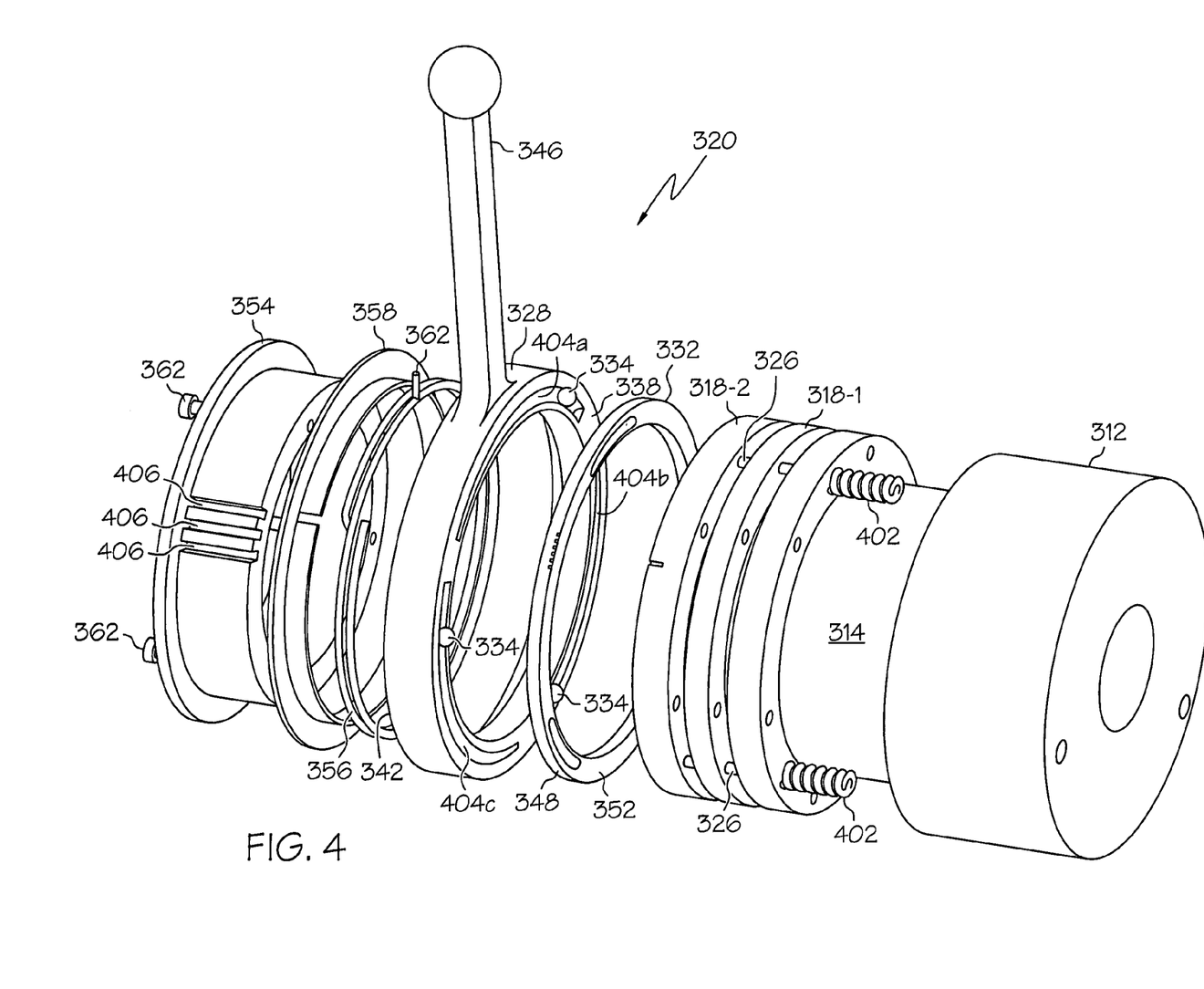
FIGS. 4 and 5 are exploded perspective views of the electromechanical brake shown in FIG. 3.
Figure 5:
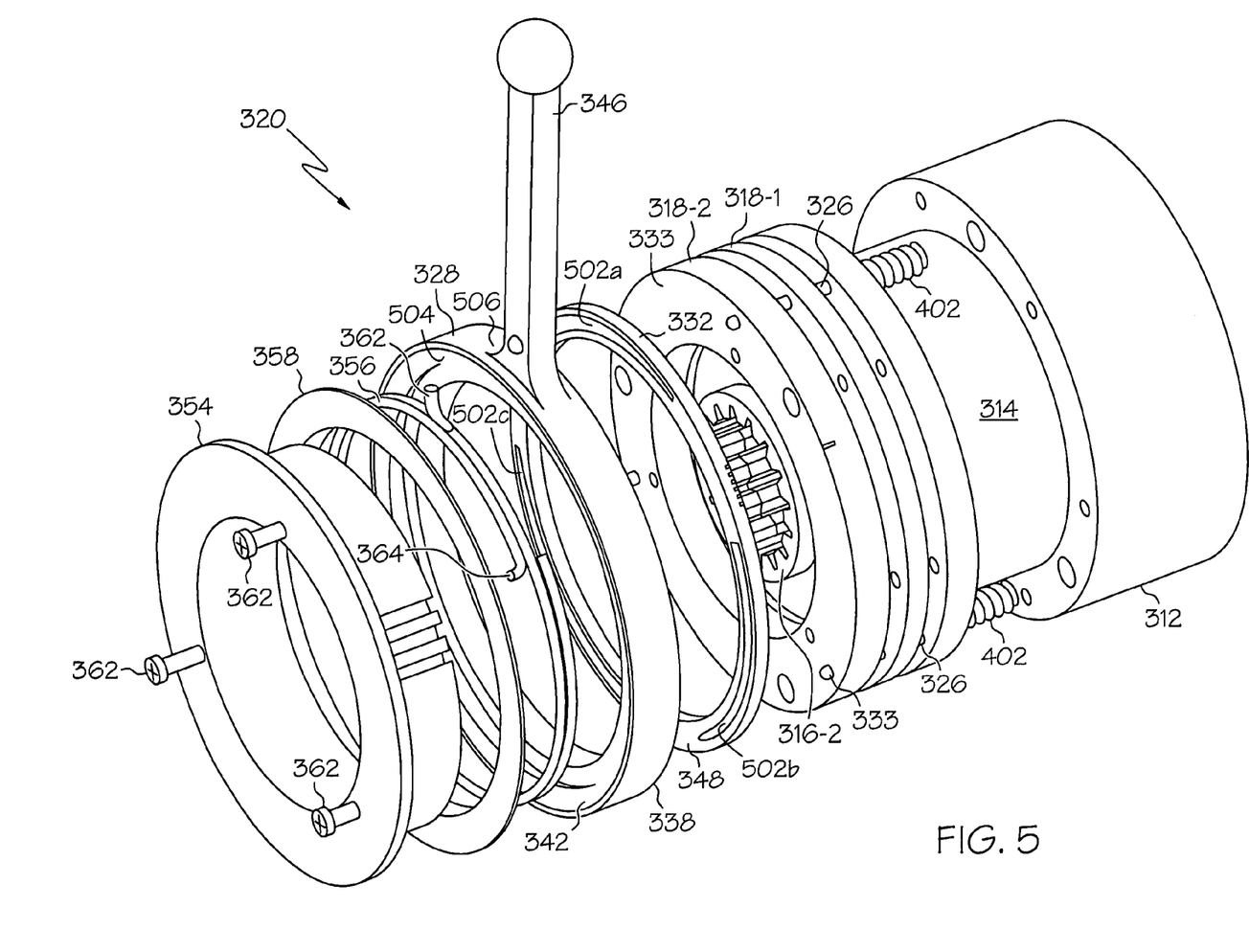

Turning now to the stator plates 318, it is seen that each stator plate 318 is mounted within the brake housing 310, and includes a central opening 319 through which the output shaft 304 passes. The first stator plates 318-1 is disposed between the rotor plates 316 and, like the armature 314, is mounted against rotation, but is free to translate. The second stator plate 318-2 is disposed between the second rotor plate 316-2 and the manual brake release mechanism 320, but is mounted against both rotation and translation. Each stator plate 318 additionally includes a plurality of engagement pin openings. The engagement pin openings extend through each of the stator plates 318 and are collocated with the engagement pins 326 that extend from the armature 314. As is shown in FIGS. 4 and 5, the engagement pins 326 extend through the engagement pin openings in each of the stator plates 318. The engagement pin openings are sized and configured such that the engagement pins 326 are readily moveable therein. Moreover, the length of each engagement pin 326 is such that when the armature 314 is in the engage position a small clearance exists between the engagement end 333 of each engagement pin 329 and the manual brake release mechanism 320. In a preferred embodiment, the magnitude of this clearance is set as close as possible to the maximum expected wear that the rotors plates 316 will incur during their service lives. This helps to ensure that as the rotor plates 316 wear, the PDU brake 228 will remain fully engaged without any interference with the manual brake release mechanism 320.

With the above-described configuration, when the armature coil 312 is de-energized (e.g., no brake release command supplied supplied to the electrical input plug 324), the bias force supplied from the brake springs 402 moves the armature 314 into the engage position. In the engage position, the armature 314 engages the first rotor plate 316-1, causing it to translate and engage the first stator plate 318-1. In turn, the first stator plate 318-1 translates and engages the second rotor plate 316-2, causing it to translate and engage the second stator plate 318-2, which is mounted against translation at least relative to the armature 314. As a result, the rotor plates 316 are prevented from rotating, which in turn prevents the output shaft 304, and thus the PDU 220, from rotating. Conversely, when the armature coil 312 is energized (e.g., the brake release command signal is supplied to the electrical input plug 324), the magnetic force generated by the armature coil 312 moves the armature 314 into the disengage position. In the disengage position, the armature 314 is disengaged from the rotor plate 316-1, which allows both rotors 316 to rotate and translate and the first stator plate 318-1 to translate. Thus, with the armature 314 in the disengage position the output shaft 304, and thus the PDU 220, is free to rotate.

It is clear from the above description that the PDU brake 228 prevents rotation of the PDU 220 when the armature coil 312 is de-energized. As was previously alluded to, it may be desired to rotate the PDU 220, or move one or more other thrust reverser components coupled to the PDU 220, as part of a repair or maintenance process while maintaining electrical power removed from the PDU brake 228. Hence, the manual brake release mechanism 320 is provided. The manual brake release mechanism 320, which will now be described in detail, is configured to allow manual movement of the PDU brake 228 between the engage and disengage position.

With reference to FIGS. 4 and 5, it is seen that the manual brake release mechanism 320 includes two release plates, a first release plate 328, a second release plate 332, and a plurality of transmission balls 334. The first release plate 328 is rotationally mounted within the brake housing 310 and includes an interior side 338 and an exterior side 342. A handle 346 extends from the first release plate 328 and is used to manually rotate the first release plate 328. A plurality of first grooves 404a–c are formed on the first release plate interior side 338. Preferably, each of the first grooves 404a–c is configured to include a cam surface.

The second release plate 332, which is mounted against rotation within the brake housing 310 while being free to translate therein, is constructed substantially similar to the first release plate 328. As such, the second release plate 332 includes an interior side 348, an exterior side 352, and a plurality of second grooves 502a–c (see FIG. 5) formed on the second plate interior side 348 that are substantially collocated with the first grooves 404a–c. Similar, to the first grooves 404a–c, each of the second grooves 502a–c is preferably configured to include a cam surface.

Although three first grooves 404a–c and three second grooves 502a–c are included in the depicted embodiment, it will be appreciated that this number of grooves is merely exemplary, and that other numbers may be provided in each release plate 328, 332. Additionally, while the first 328 and second 332 release plates are depicted as having the same number of grooves, it will be appreciated that this is also not necessary, and that each release plate 328, 332 may have differing numbers of grooves. Preferably, however, the first release plate 328 has at least two grooves that are substantially aligned with two grooves on the second release plate 332. In any case, it is within the substantially aligned first 404a–c and second 502a–c grooves that one each of the transmission balls 334 is positioned.

In addition to each of the components described above, the manual brake release mechanism 320 preferably includes a release mechanism mount 354, a handle spring 356, and a bearing ring 358. The first 328 and second 332 release plates, the bearing ring 358, and the handle spring 356, are all mounted on the release mechanism mount 354. The release mechanism mount 354 is in turn coupled to the second stator plate 318-2 via a plurality of fasteners 362. More specifically, the bearing ring 358 is disposed between the release mechanism mount 354 and the first release plate 328. The bearing ring 358 is preferably made of a low-friction material, such as Teflon, and significantly reduces the friction between the release mechanism mount 354 and the first release plate 328 when the first release plate 328 is rotated.

The handle spring 356 has a first end 364, which is coupled to the handle 346, and a second end 366 (seen most clearly in FIG. 5), which is coupled to the release mechanism mount 354. In particular, the handle spring first end 364 is inserted into a spring engagement slot 504 (see FIG. 5) formed in the handle 346, and the handle spring second end 366 is inserted into one of a plurality of spring engagement slots 406 (see FIG. 4) formed in the release mechanism mount 354.

Figure 6:
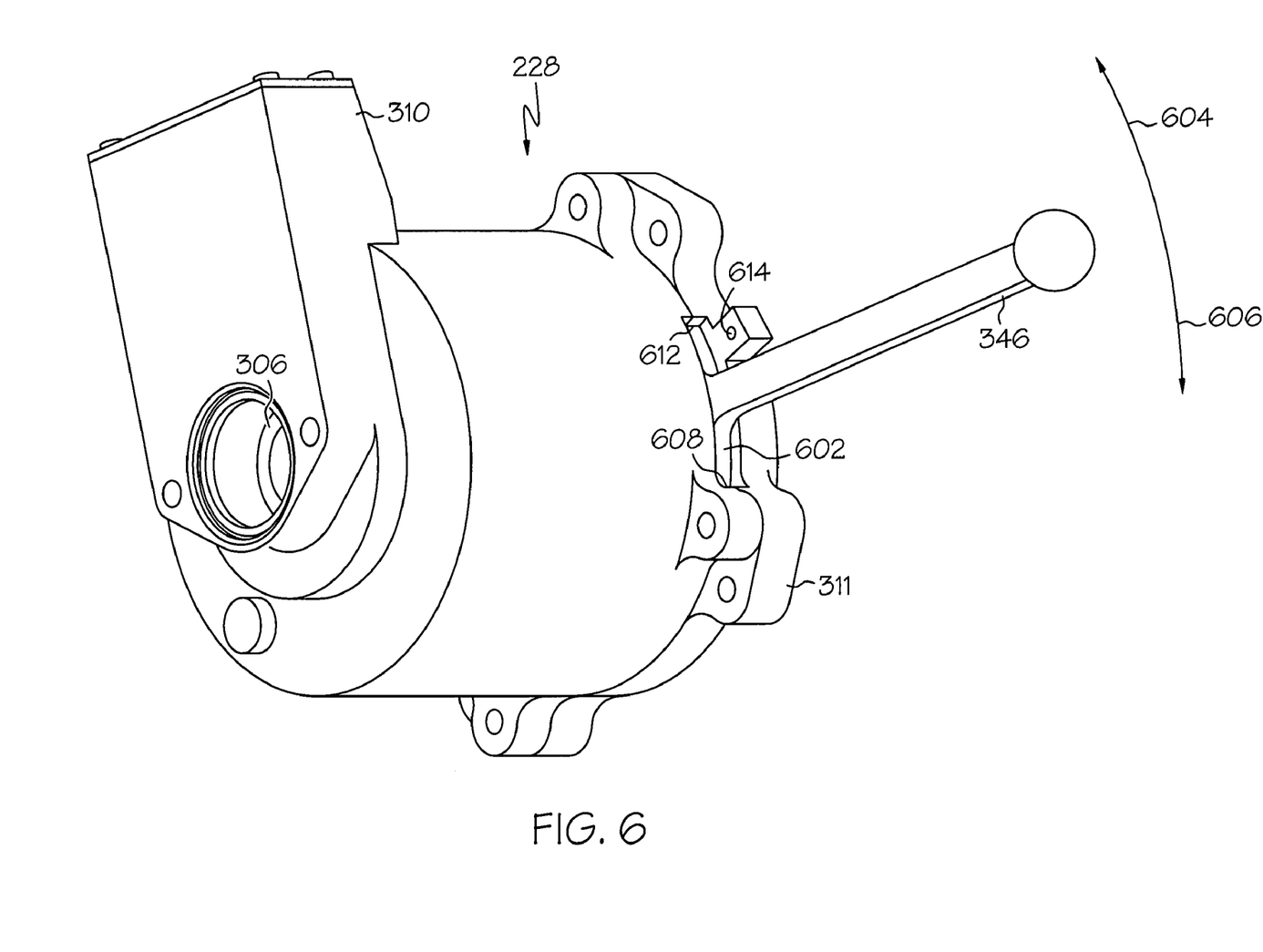
FIGS. 6 and 7 are perspective views of a portion of the electromechanical brake shown in FIG. 3 in its assembled state.

With reference now to FIG. 6, it is seen that when the PDU brake 228 is assembled, the handle 346 extends through a slot 602 formed between the brake housing 310 and the cover plate 311. Thus, while the first release plate 328 is configured to rotate in both a first direction 604 and a second direction 606, the slot 602 limits its rotation between two rotational positions. One of these rotational positions corresponds to a brake release position 608, and the other rotational position corresponds to a brake engage position 612. When the handle 346 is in the brake release position 608, the manual brake release mechanism 320 moves the PDU brake 228 to the disengage position. Specifically, when the handle is moved to the brake release position 608, the first release plate 328 is correspondingly rotated. As the first release plate 328 rotates, the transmission balls 334 translate along the cam surfaces in the first 404a–c and second 502a–c grooves, causing the second release plate 332 to translate toward the second stator plate 318-2. As the second release plate 332 translates, it applies a force to the engagement ends 333 of the engagement pins 326 that extend through the second stator plate 318-1. This force is transmitted to the armature 314, which causes the armature 314 to move to the disengage position. Conversely, when the handle 346 is in the brake engage position 612, the transmission balls 334 are positioned within the first 404a–c and second 502a–c groove cam surfaces such that the second release plate 332 supplies no force to the engagement pins 326, and therefore has no effect on the position of the armature 314. Thus, with the handle 346 in the brake engage position 612, the armature 314 will be in the engage position unless it is energized.

It will be appreciated that the handle spring 356 is configured to supply a bias force to the handle 346, and thus the first release plate 328, that biases the handle 346 toward the brake engage position 612. In addition, and as shown most clearly in FIGS. 5 and 6, the handle 346 and cover plate 311 include a mechanism to releasably lock the handle 346 in the brake engage position. Specifically, a lock button 506 (see FIG. 5), such as a spherical ball, is disposed within a recess formed in the handle 346, and a detent 614 (see FIG. 6) is formed in a section of the cover plate 311. The lock button 506 and detent 614 are sized and configured to provide a positive tactile and visible means of locking the manual brake release mechanism 320 in the brake engage position.

Figure 7:
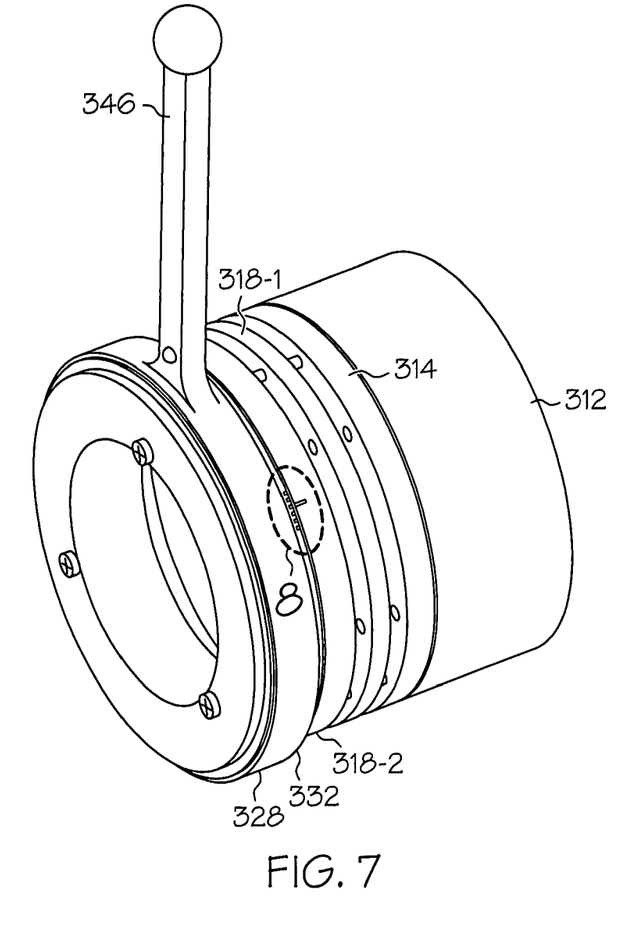
Figure 8:
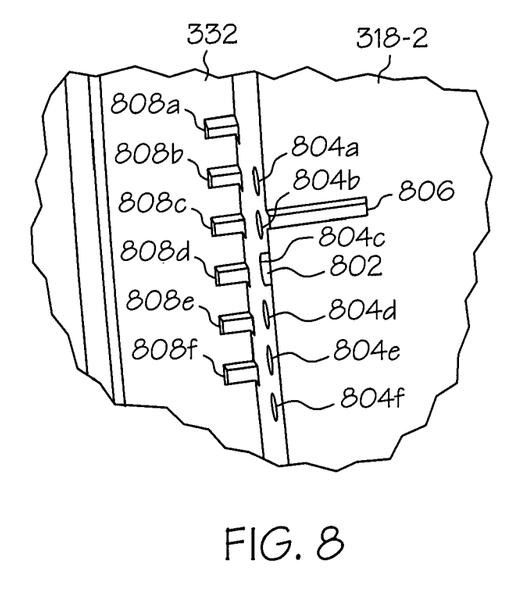
FIG. 8 is a close up view of a portion of the electromechanical brake assembly shown in FIG. 7.

Turning now to FIGS. 7 and 8, an additional structural feature that may be incorporated into the PDU brake 228 will be described. This additional feature allows the positions of the second release plate 332 and transmission balls 334 to be varied during assembly of the PDU brake 228, to make up for potential manufacturing variations and tolerances without the need for shimming. In particular, and as shown most clearly in FIG. 8, an index pin 802 is coupled to, or inserted into an opening formed in, the second stator plate 318-2, and is also into one of a plurality of index openings 804a–f that are formed in the second release plate exterior side 352. A visual indication of which index opening 804a–f the index pin 802 is inserted into is provided via a plurality of index notches. One index notch 806 is formed on the periphery of the second stator plate 318-2 at a position that corresponds to the index pin 802, and the remaining notches 808a–f are formed on the periphery of the second release plate 332 at the positions that correspond to each of the index openings.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A system for moving an aircraft thrust reverser, comprising:
   a power drive unit operable to rotate and thereby supply a rotational drive force;
   a thrust reverser actuator assembly coupled to receive the rotational drive force and operable, in response thereto, to selectively move the thrust reverser between a stowed position and a deployed position;
   an electromechanical brake coupled to the power drive unit, the electromechanical brake configured to receive a brake release command and operable, in response thereto, to selectively move between an engage and a disengage position, to thereby prevent and allow, respectively, rotation of the power drive unit; and
   a manual brake release mechanism disposed proximate the electromechanical brake and configured to selectively move the electromechanical brake between the engage and disengage position, the manual brake release mechanism including:
     a first release plate configured to selectively rotate in either a first or a second rotational direction in response to an input force, and
     a second release plate coupled to the first release plate and configured to move in either a first or a second translational direction in response to the first release plate rotating in the first or second rotational direction, respectively, to move the electromechanical brake to the disengage or engage position, respectively.

2. The system of claim 1, further comprising:
   a handle coupled to, and extending from, the first release plate to allow manual rotation thereof.

3. The system of claim 1, wherein the electromechanical brake comprises:
   a housing;
   a rotor plate rotationally mounted within the housing and coupled to receive the rotational drive force;
   an armature mounted against rotation within the housing and disposed proximate the rotor plate, the armature configured to move between (i) an engage position, in which the armature engages the rotor plate to prevent rotation thereof, and (ii) a disengage position, in which the armature does not engage the rotor plate to allow rotation thereof;
   one or more brake springs disposed within the housing and configured to supply a bias force that biases the armature toward the engaged position; and
   an armature coil disposed within the housing, the armature coil configured to be selectively energized, to thereby generate a magnetic force that moves the armature to the disengaged position.

4. The system of claim 3, wherein:
   the first release plate includes an exterior side, and an interior side having at least two grooves formed therein, the grooves each having a cam surface;
   the second release plate includes an exterior side, and an interior side opposed to the first release plate interior side and having at least two grooves formed therein that are substantially aligned with at least two of the grooves in the first release plate, the grooves in the second release plate each having a cam surface; and the manual brake further includes at least two balls, each positioned in the aligned grooves.

5. The system of claim 4, further comprising:
an engagement pin coupled to the armature and extending therefrom, the engagement pin having an engagement end disposed at least proximate the second release plate,
wherein the second release plate engages the armature via the engagement pin, to thereby move the electromechanical brake to the disengage position.

6. The system of claim 3, wherein the electromechanical brake further comprises:
a second rotor plate rotationally mounted within the housing;
a first stator plate mounted against rotation within the housing and disposed between the rotor plates;
a second stator plate mounted against rotation within the housing and disposed between the second rotor plate and the second release plate exterior side;
an engagement pin coupled to the armature and extending therefrom, the engagement pin having an engagement end disposed at least proximate the second release plate,
wherein the second release plate engages the armature via the engagement pin, to thereby move the electromechanical brake to the disengage position.

7. The system of claim 6, wherein the engagement pin extends through at least a portion of the first and second stator plates.

8. The system of claim 6, further comprising:
a plurality of spaced-apart index openings formed in the second release plate exterior side; and
an index pin coupled to the second stator plate, the index pin extending at least partially into one of the index openings.

9. The system of claim 8, wherein the second release plate and second stator plate each have an outer peripheral surface, and wherein the system further comprises:
a plurality of index opening notches formed on the second release plate outer peripheral surface, each index opening notch radially aligned with one of the index openings; and
an index pin notch formed on the second stator plate outer peripheral surface, the index pin notch radially aligned with the index pin.

10. The system of claim 3, further comprising:
a handle coupled to, and extending from, the first release plate to allow manual rotation thereof;
a lock button disposed within, and extending at least partially from, the handle; and
a handle detent formed in the housing and configured to receive at least a portion of the lock button therein.

11. The system of claim 10, further comprising:
a handle spring coupled between the handle and the housing and configured to bias the first release plate to rotate in the second rotational direction.

12. The system of claim 11, wherein the handle spring has a first end and a second end, the handle spring first end coupled to the handle, and wherein the system further comprises:
a release mechanism mount disposed within the housing and extending at least partially through the first and second release plates; and
a plurality of slots formed on the release mechanism mount,
wherein the handle spring second end is disposed at least partially within one of the slots.

13. A thrust reverser system electromagnetic brake assembly, comprising:
a housing;
a rotor plate rotationally mounted within the housing;
an armature mounted against rotation within the housing and disposed proximate the rotor plate, the armature configured to move between (i) an engage position, in which the armature engages the rotor plate to prevent rotation thereof, and (ii) a disengage position, in which the armature does not engage the rotor plate to allow rotation thereof;
one or more springs disposed within the housing and configured to supply a bias force that biases the armature toward the engaged position;
an armature coil disposed within the housing, the armature coil configured to be selectively energized, to thereby generate a magnetic force that moves the armature to the disengaged position; and
a manual brake release mechanism disposed proximate the electromechanical brake and configured to selectively move the armature between the engage and disengage position, the manual brake release mechanism including:
a first release plate configured to selectively rotate in either a first or a second rotational direction in response to an input force, and
a second release plate coupled to the first release plate and configured to move in either a first or a second translational direction in response to the first release plate rotating in the first or second rotational direction, respectively, to thereby move the armature to the disengage or engage position, respectively.

14. The brake assembly of claim 13, wherein:
the first release plate includes an exterior side, and an interior side having at least two grooves formed therein, the grooves each having a cam surface;
the second release plate includes an exterior side, and an interior side opposed to the first release plate interior side and having at least two grooves formed therein that are substantially aligned with at least two of the grooves in the first release plate, the grooves in the second release plate each having a cam surface; and
the manual brake further includes at least two balls, each positioned in the aligned grooves.

15. The system of claim 14, further comprising:
an engagement pin coupled to the armature and extending therefrom, the engagement pin having an engagement end disposed at least proximate the second release plate,
wherein the second release plate engages the armature via the engagement pin, to thereby move the electromechanical brake to the disengage position.

16. The system of claim 13, wherein the electromechanical brake further comprises:
a second rotor plate rotationally mounted within the housing;
a first stator plate mounted against rotation within the housing and disposed between the rotor plates;
a second stator plate mounted against rotation within the housing and disposed between the second rotor plate and the second release plate exterior side;
an engagement pin coupled to the armature and extending therefrom, the engagement pin having an engagement end disposed at least proximate the second release plate, wherein the second release plate engages the armature via the engagement pin, to thereby move the electromechanical brake to the disengage position.

17. The system of claim 16, wherein the engagement pin extends through at least a portion of the first and second stator plates.

18. The system of claim 16, further comprising:
a plurality of spaced-apart index openings formed in the second release plate exterior side; and
an index pin coupled to the second stator plate, the index pin extending at least partially into one of the index openings.

19. The system of claim 18, wherein the second release plate and second stator plate each have an outer peripheral surface, and wherein the system further comprises:
a plurality of index opening notches formed on the second release plate outer peripheral surface, each index opening notch radially aligned with one of the index openings; and
an index pin notch formed on the second stator plate outer peripheral surface, the index pin notch radially aligned with the index pin.

20. The system of claim 13, further comprising:
a handle coupled to, and extending from, the first release plate to allow manual rotation thereof;
a lock button disposed within, and extending at least partially from, the handle; and
a handle detent formed in the housing and configured to receive at least a portion of the lock button therein.

21. The system of claim 20, further comprising:
a handle spring coupled between the handle and the housing and configured to bias the first release plate to rotate in the second rotational direction.

22. The system of claim 21, wherein the handle spring has a first end and a second end, the handle spring first end coupled to the handle, and wherein the system further comprises:

a release mechanism mount disposed within the housing and extending at least partially through the first and second release plates; and
a plurality of slots formed on the release mechanism mount,
wherein the handle spring second end is disposed at least partially within one of the slots.

23. A thrust reverser system manual brake release mechanism, comprising:
a first release plate including an exterior side and an interior side;
at least two grooves formed in the first release plate interior side, the grooves each having a cam surface located at a predetermined angle;
a second release plate including an exterior side and an interior side, the second release plate interior side positioned opposed to the first release plate interior side;
at least two grooves formed in the second release plate interior side and substantially aligned with at least two of the grooves in the first release plate, the grooves in the second release plate each having a cam surface located at a predetermined angle;
at least two balls, each positioned in the aligned grooves;
a handle coupled to, and extending from, the first release plate to allow manual rotation thereof;
an alignment mechanism extending at least partially through the first and second release plates;
a plurality of slots formed on the manual brake alignment mechanism; and
a spring having a first end and a second end, the spring first end coupled to the handle, the spring second end disposed within one of the manual brake alignment mechanism slots.

* * * * *